United States Patent
Wegerer et al.

(10) Patent No.: US 9,776,877 B2
(45) Date of Patent: Oct. 3, 2017

(54) SEPARATION OF CONJUNCT POLYMER FROM VOLATILE REGENERANT FOR IONIC LIQUID REGENERATION

(71) Applicant: UOP LLC, Des Plaines, IL (US)

(72) Inventors: David A. Wegerer, Lisle, IL (US); Trung Pham, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 425 days.

(21) Appl. No.: 14/567,913

(22) Filed: Dec. 11, 2014

(65) Prior Publication Data

US 2016/0167038 A1  Jun. 16, 2016

(51) Int. Cl.
*C01B 33/08* (2006.01)
*C01B 35/06* (2006.01)
(Continued)

(52) U.S. Cl.
CPC ........... *C01B 33/08* (2013.01); *B01J 31/0277* (2013.01); *B01J 31/4069* (2013.01); *B01J 38/50* (2013.01); *B01J 38/60* (2013.01); *C01B 35/061* (2013.01); *B01J 2231/40* (2013.01); *B01J 2531/98* (2013.01); *Y02P 20/584* (2015.11)

(58) Field of Classification Search
CPC ....... C01B 33/00; C01B 33/021; C01B 33/08; C01B 33/10; C01B 35/06; C01B 35/061; C07C 7/00; C07C 7/005; C07C 7/04; C07C 7/08; C07C 7/10; C07C 7/12; C07C 7/13; B01D 3/00; B01D 3/14; B01D 3/143; B01D 3/146; B01D 3/40; B01D 11/00; B01D 11/02; B01D 11/028; B01D 11/0284; B01D 11/0288; B01D 11/04; B01D 11/0488; B01D 11/0492; B01D 15/00; B01D 17/02; B01D 17/0202; B01J 21/02; B01J 21/06; B01J 21/20; B01J 38/00; B01J 38/02; B01J 38/48; B01J 38/60; B01J 38/50; B01J 38/68; B01J 38/74; B01J 31/02; B01J 31/0277; B01J 31/40; B01J 31/4007; B01J 31/4069; B01J 2531/98; B01J 2231/40; C07F 5/02; C07F 5/027; C07F 7/08; C07F 7/0801
USPC ....... 203/39, 41, 43; 208/143; 210/634, 638, 210/663, 669, 774, 806; 423/292, 341;
(Continued)

(56) References Cited

U.S. PATENT DOCUMENTS 3,115,526 A * 12/1963 D Alelio .................. C06B 47/10
  149/121
5,276,245 A * 1/1994 Eastman .............. B01J 31/0222
  585/723

(Continued)

*Primary Examiner* — Joseph Drodge

(57) ABSTRACT

Processes for separating conjunct polymer from an organic phase are described. A mixture comprising an ionic liquid phase and the organic phase into the ionic phase and an organic phase comprising the conjunct polymer and at least one silyl or boryl compound. The organic phase is separated in a fractionation column into an overhead fraction comprising unreacted silane or borane compound and a bottoms fraction comprising the conjunct polymer and the silyl or boryl compound. The bottoms fraction is passed through an adsorption zone, and the silyl or boryl compound is recovered. Alternatively, the organic phase is passed through an adsorption zone first to remove the conjunct polymer and then a fractionation zone to separate the unreacted silane or borane compound from the silyl or boryl compound.

18 Claims, 2 Drawing Sheets

(51) Int. Cl.
  *B01J 38/50*   (2006.01)
  *B01J 38/60*   (2006.01)
  *C07F 5/02*    (2006.01)
  *C07F 7/08*    (2006.01)
  *B01D 3/14*    (2006.01)
  *B01D 3/40*    (2006.01)
  *B01D 15/00*   (2006.01)
  *B01J 31/40*   (2006.01)
  *B01J 31/02*   (2006.01)

(58) Field of Classification Search
  USPC ...... 502/20, 22, 24; 585/818, 820, 826, 833, 585/834, 900, 901, 902
  See application file for complete search history.

(56) References Cited

U.S. PATENT DOCUMENTS

| | | | |
|---|---|---|---|
| 7,514,590 B1* | 4/2009 | Rice | C07C 5/2775 585/734 |
| 7,674,739 B2 | 3/2010 | Elomari et al. | |
| 7,732,364 B2 | 6/2010 | Chang et al. | |
| 8,088,338 B2 | 1/2012 | Luo et al. | |
| 8,388,828 B2 | 3/2013 | Elomari et al. | |
| 8,518,240 B2 | 8/2013 | Serban et al. | |
| 8,524,623 B2 | 9/2013 | Timken et al. | |
| 8,927,800 B2* | 1/2015 | Mahieux | C07C 7/14883 585/709 |
| 9,096,618 B1* | 8/2015 | Martins | C07F 7/0801 |
| 9,120,092 B1* | 9/2015 | Broderick | B01J 31/4053 |
| 9,221,043 B2* | 12/2015 | Broderick | B01J 31/0277 |
| 9,328,026 B2* | 5/2016 | Okajima | B32B 18/00 |
| 2009/0018290 A1* | 1/2009 | Casty | C08F 10/06 526/107 |
| 2009/0163759 A1* | 6/2009 | Driver | C07C 2/60 585/826 |
| 2012/0160740 A1* | 6/2012 | Zhan | C07C 1/24 208/64 |
| 2014/0005459 A1 | 1/2014 | Zhan et al. | |

* cited by examiner

US 9,776,877 B2

1

SEPARATION OF CONJUNCT POLYMER FROM VOLATILE REGENERANT FOR IONIC LIQUID REGENERATION

BACKGROUND OF THE INVENTION

Commercially, the alkylation of isoparaffins is catalyzed by acids such as sulfuric acid and hydrofluoric acid. Conjunct polymer (acid soluble oils, (ASO) also known as red oil) forms as a byproduct of the alkylation reaction, as well as other hydrocarbon reactions. When too much conjunct polymer is present, the acid catalyst loses its effectiveness. The acid must be replaced with stronger acid, or the conjunct polymer must be removed in order to reactivate the catalyst. With sulfuric acid as the catalyst, the ASO is burned, and with hydrofluoric acid, the hydrofluoric acid is distilled away from the ASO. Sulfuric acid and hydrofluoric acid are hazardous and corrosive, and their use in industrial processes requires a variety of environmental controls.

There has been a move to replace the use of sulfuric acid and hydrofluoric acid with more environmentally friendly materials.

One such process utilizes acidic ionic liquids as catalysts in hydrocarbon conversion processes, such as alkylation, isomerization, disproportionation, reverse disproportionation, and oligomerization. Conjunct polymers are byproducts of the hydrocarbon reaction using ionic liquids, and they form a complex with the ionic liquid catalyst. The ionic liquid catalyst loses its effectiveness over time as the amount of conjunct polymer increases. It must then either be replaced or regenerated. Because ionic liquids are typically fairly expensive, processes for regenerating the ionic liquid catalysts are needed.

A variety of methods for regenerating ionic liquids have been developed. The ionic liquid containing the conjunct polymer could be contacted with a reducing metal (e.g., Al), an inert hydrocarbon (e.g., hexane), and hydrogen and heated to about 100° C. The conjunct polymer will be transferred to the hydrocarbon phase, allowing for the conjunct polymer to be removed from the ionic liquid phase. See e.g., U.S. Pat. No. 7,651,970; U.S. Pat. No. 7,825,055; U.S. Pat. No. 7,956,002; and U.S. Pat. No. 7,732,363.

Another method involves contacting the ionic liquid containing the conjunct polymer with a reducing metal (e.g., Al) in the presence of an inert hydrocarbon (e.g. hexane), but in the absence of added hydrogen, and heating to about 100° C. The conjunct polymer will be transferred to the hydrocarbon phase, allowing for the conjunct polymer to be removed from the ionic liquid phase. See e.g., U.S. Pat. No. 7,674,739.

Still another method of regenerating the ionic liquid involves contacting the ionic liquid containing the conjunct polymer with a reducing metal (e.g., Al), HCl, and an inert hydrocarbon (e.g. hexane), and heating to about 100° C. The conjunct polymer will be transferred to the hydrocarbon phase, allowing for the CP to be removed from the IL phase. See e.g., U.S. Pat. No. 7,727,925.

The ionic liquid can be regenerated by adding a homogeneous metal hydrogenation catalyst (e.g., $(PPh_3)_3RhCl$) to the ionic liquid containing the conjunct polymer and an inert hydrocarbon (e.g. hexane). Hydrogen would be introduced, and the conjunct polymer would be reduced and transferred to the hydrocarbon layer. See e.g., U.S. Pat. No. 7,678,727.

Another method for regenerating the ionic liquid involves adding HCl, isobutane, and an inert hydrocarbon to the ionic liquid containing the conjunct polymer and heating to about 100° C. The conjunct polymer would react to form an uncharged complex, which would transfer to the hydrocarbon phase. See e.g., U.S. Pat. No. 7,674,740.

The ionic liquid could also be regenerated by adding a supported metal hydrogenation catalyst (e.g. Pd/C) to the ionic liquid containing the conjunct polymer and an inert hydrocarbon (e.g. hexane). Hydrogen would be introduced and the conjunct polymer would be reduced and transferred to the hydrocarbon layer. See e.g., U.S. Pat. No. 7,691,771.

Still another method involves adding a basic reagent that displaces the conjunct polymer and is a part of the regeneration of the catalyst. The basic reagents are described as nitrogen-containing compounds such as amines, pyridinium compounds, or pyrrolidinium compounds. For example, a suitable substrate (e.g. pyridine) is added to the ionic liquid containing the conjunct polymer. After a period of time, an inert hydrocarbon would be added to wash away the liberated conjunct polymer. The ionic liquid precursor [butylpyridinium][Cl] would be added to the ionic liquid (e.g. [butylpyridinium][$Al_2Cl_7$]) containing the conjunct polymer followed by an inert hydrocarbon. After a given time of mixing, the hydrocarbon layer would be separated, resulting in a regenerated ionic liquid. The solid residue would be converted to catalytically active ionic liquid by adding $AlCl_3$. See e.g., U.S. Pat. No. 7,737,363 and U.S. Pat. No. 7,737,067.

Another method involves adding the ionic liquid containing the conjunct polymer to a suitable substrate (e.g. pyridine) and an electrochemical cell containing two aluminum electrodes and an inert hydrocarbon. A voltage would be applied and the current measured to determine the extent of reduction. After a given time, the inert hydrocarbon would be separated, resulting in a regenerated ionic liquid. See, e.g., U.S. Pat. No. 8,524,623.

All of these regeneration approaches have drawbacks. Many of them cannot achieve above 90% conversion of the conjunct polymer, which then builds up in the process. Of those that can provide high levels of conversion, hydrogenation of the spent ionic liquid with supported (e.g., U.S. Pat. No. 7,691,771) and unsupported (e.g., U.S. Pat. No. 7,678,727) hydroprocessing catalysts may result in the active catalytic metals being extracted into the ionic liquid phase. Many catalyst supports also react irreversibly with the chloroaluminate anion of the ionic liquid. Although the use of metallic aluminum for regeneration (e.g., U.S. Pat. No. 7,995,495) is effective, it introduces undesirable solids handling issues into the refinery. Finely divided aluminum is pyrophoric and presents safety issues in a refining environment. This approach also results in the creation of additional $AlCl_3$, which has to be removed from the ionic liquid phase (e.g., U.S. Pat. No. 7,754,636) to avoid building up to a molar ratio relative to the ionic liquid cation at which solids will start precipitating out of solution and cause plugging issues. Electrochemical approaches (e.g., U.S. Pat. No. 8,524,623) are not economically viable at commercial scales.

Therefore, there remains a need for additional methods of regenerating ionic liquids used as catalysts in reactions.

SUMMARY OF THE INVENTION

One aspect of the invention involves a process for separating conjunct polymer from an organic phase. In one embodiment, the process includes separating a mixture comprising an ionic liquid phase and the organic phase into the ionic phase comprising ionic liquid and the organic phase comprising the conjunct polymer and at least one silyl or boryl compound. The organic phase is separated in a first fractionation column into at least a first overhead fraction comprising unreacted silane or borane compound and a first bottoms fraction comprising the conjunct polymer and at least a portion of the at least one silyl or boryl compound. The first bottoms fraction is passed through a first adsorption zone, and at least the portion of the silyl or boryl compound is recovered. Alternatively, the organic phase is passed through a second adsorption zone. A stream comprising unreacted silane or borane compound and the at least one silyl or boryl compound is recovered. The stream comprising the unreacted silane or borane compound and the at least one silyl or boryl compound is separated in a second fractionation column into at least a second overhead fraction comprising the unreacted silane or borane compound and a second bottoms fraction comprising the at least a portion of the at least one silyl or boryl compound.

DETAILED DESCRIPTION OF THE INVENTION

Figure 1:
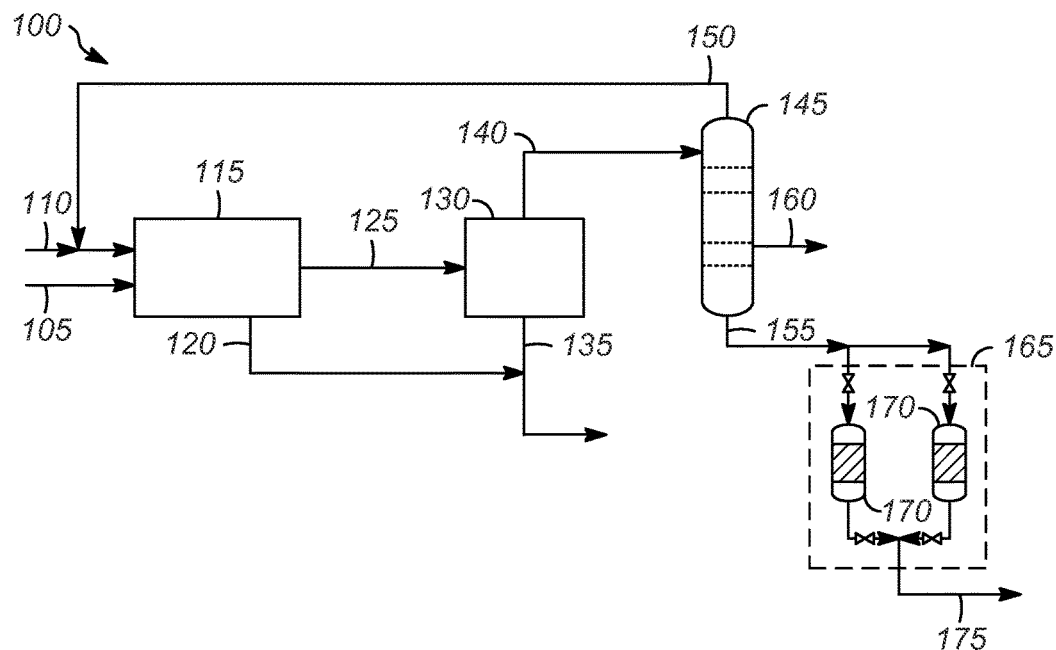
FIG. 1 illustrates one embodiment of a method for separating conjunct polymer from an organic phase according to the present invention.

U.S. application Ser. No. 14/269,943, entitled REGENERATION OF AN ACIDIC CATALYST BY SILANE ADDITION, filed May 5, 2014, and U.S. application Ser. No. 14/269,978, entitled REGENERATION OF AN ACIDIC CATALYST BY BORANE ADDITION, filed May 5, 2014, describe methods of regenerating deactivated acidic ionic liquid catalysts containing conjunct polymer silane or borane compounds. This process has a number of advantages. The silane and borane compounds contain no metals and react at mild conditions. The mild operating conditions may result in lower operating costs than processes requiring harsher conditions, as well as lower capital costs because less expensive materials of construction can be used.

The process involves contacting silane or borane compounds with an ionic liquid catalyst that contains conjunct polymer. The silane or borane compounds react with the acid sites of the ionic liquid catalyst. For example, the silane or borane compounds will react with the acidic sites in a halometallate ionic liquid to form silyl or boryl halides. The acid sites that were binding the conjunct polymer are no longer present, which allows the conjunct polymer to be removed.

The conjunct polymer has to be separated from the silyl or boryl compounds so that the silyl or boryl compounds can be regenerated into the initial silane or borane compounds so that they can be reused.

One of the methods of separation described in these applications involves sending a hydrocarbon phase containing the silyl or boryl compounds, as well as solvent (if present), conjunct polymer, hydrogen, and any unreacted silane or borane compounds to a separation zone for separation. The hydrocarbon phase is separated into an overhead stream of hydrogen, a stream of solvent and an unreacted silane or borane compounds, a side stream of silyl or boryl compound, and a bottoms stream of conjunct polymer.

However, it was discovered that having pure conjunct polymer in the bottoms stream required high temperatures in the reboiler, as discussed below. High reboiler temperatures increase the risk of the fouling the column, such as by plugging or coking from thermal oligomerization of the conjunct polymer. Furthermore, it requires higher energy consumption, which is undesirable. The column pressure can be reduced in order to reduce the temperature; however, there are limits to how much the pressure can be reduced.

Consequently, a new separation process was developed. The process involves combining an adsorption zone with a fractionation column. In one embodiment, the fractionation column is before the adsorption zone. A stream rich in the unreacted silane or borane compounds and any solvent present are removed in an overhead stream and recycled to the regeneration zone. The bottoms stream contains the silyl or boryl compounds and the conjunct polymer. The bottoms stream is then contacted with an adsorber where the conjunct polymer is adsorbed, and the silyl or boryl compounds are removed. The silyl or boryl compounds can be sent for recovery of the silane or borane compounds.

In another embodiment, the adsorption zone is before the fractionation zone. In this case, the conjunct polymer is adsorbed, and a stream containing the unreacted silane or borane compounds, any solvent present, and the silyl or boryl compounds. The stream is then separated in a fractionation column into an overhead stream comprising the unreacted silane or borane compound and the solvent (if present), and the silyl or boryl compounds.

This process allows the fractionation column to be run at lower temperature and normal pressures, rather than under vacuum.

In the process 100 shown FIG. 1, a stream 105 comprising the deactivated acidic ionic liquid catalyst containing conjunct polymer and a stream 110 of the silane or borane compound are sent to the ionic liquid regeneration zone 115.

By deactivated ionic liquid catalysts containing conjunct polymer, we mean acidic ionic liquid catalysts that have been used in hydrocarbon conversion processes, and in which conjunct polymers have formed. By conjunct polymer, we mean the olefinic, conjugated cyclic hydrocarbons that form as a byproduct of various hydrocarbon conversion processes, including but not limited to alkylation, oligomerization, isomerization, disproportionation, and reverse disproportionation.

By acidic ionic liquid, we mean an ionic liquid capable of catalyzing reactions typically carried out with an acid. As known in the art, acids such as sulfuric acid and hydrofluoric acid are often used to catalyze these reactions. These reactions include, e.g. alkylation, oligomerization, isomerization, disproportionation, and reverse disproportionation. Oftentimes the acids employed in these reactions have Hammett acidity functions ($H_0$) less than 7, or less than 5, or less than 3, or less than 0, or less than −3, or less than −5, or less than −7, or less than −9. If the ionic liquid does not possess an acidic proton in its structure (e.g. 1-butyl-3-methylimidazolium heptachloroaluminate), addition of an exogenous acid is acceptable, provided the Hammett acidity function ($H_0$) of the added acid is less than 7 within the ionic liquid, or less than 5, or less than 3, or less than 0, or less than −3, or less than −5, or less than −7, or less than −9. Acidic chloroaluminate-containing ionic liquids have a molar ratio of Al to cation greater than 1.

By the term about, we mean within 10% of the specified value, or within 5%, or within 1%.

The deactivated acidic ionic liquid catalyst stream 105 and the silane or borane compound 110 are contacted for a period of time sufficient to allow the conjunct polymer to react with the silane or borane compound.

The ionic liquid containing the conjunct polymer can be pre-treated (not shown) before it is contacted with the silane or borane compound. The pretreatment can be used to remove any free acid, such as HCl, which might increase the consumption of the silane or borane compound, and/or any dissolved solvent, which might associate with the conjunct polymer. The pretreatment can be in a fractionation column, for example.

The ionic liquid can be any acidic ionic liquid. There can be one or more ionic liquids. The ionic liquid comprises an organic cation and an anion. Suitable cations include, but are not limited to, nitrogen-containing cations and phosphorus-containing cations. Suitable organic cations include, but are not limited to:

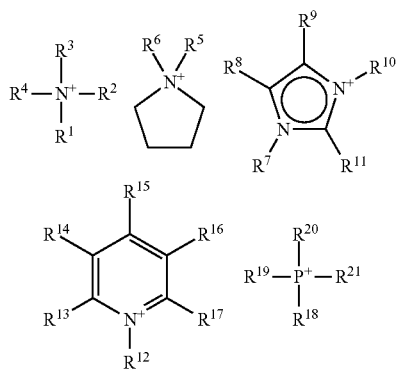

where $R^1$-$R^{21}$ are independently selected from $C_1$-$C_{20}$ hydrocarbons, $C_1$-$C_{20}$ hydrocarbon derivatives, halogens, and H. Suitable hydrocarbons and hydrocarbon derivatives include saturated and unsaturated hydrocarbons, halogen substituted and partially substituted hydrocarbons and mixtures thereof. $C_1$-$C_8$ hydrocarbons are particularly suitable.

The anion can be derived from halides, typically halometallates, and combinations thereof. The anion is typically derived from metal and nonmetal halides, such as metal and nonmetal chlorides, bromides, iodides, fluorides, or combinations thereof. Combinations of halides include, but are not limited to, mixtures of two or more metal or nonmetal halides (e.g., $AlCl_4^-$ and $BF_4^-$), and mixtures of two or more halides with a single metal or nonmetal (e.g., $AlCl_3Br^-$). In some embodiments, the metal is aluminum, with the mole fraction of aluminum ranging from 0<Al<0.25 in the anion. Suitable anions include, but are not limited to, $AlCl_4^-$, $Al_2Cl_7^-$, $Al_3Cl_{10}^-$, $AlCl_3Br^-$, $Al_2Cl_6Br^-$, $Al_3Cl_9Br^-$, $AlBr_4^-$, $Al_2Br_7^-$, $Al_3Br_{10}^-$, $GaCl_4^-$, $Ga_2Cl_7^-$, $Ga_3Cl_{10}^-$, $GaCl_3Br^-$, $Ga_2Cl_6Br^-$, $Ga_3Cl_9Br^-$, $CuCl_2^-$, $Cu_2Cl_3^-$, $Cu_3Cl_4^-$, $ZnCl_3^-$, $FeCl_3^-$, $FeCl_4^-$, $Fe_3Cl_7^-$, $PF_6^-$, and $BF_4^-$.

The silane compound can be any compound with a reactive SiH moiety. In some embodiments, the silane compound is an organosilane. There can be one or more silanes. Suitable silane compounds include, but are not limited to, silanes having the formulas: $R_3SiH$, $R_2SiH_2$, $RSiH_3$, or $SiH_4$ where each R is independently selected from hydrocarbons or halides. Examples of suitable silanes include triethylsilane, trimethylsilane, triisopropylsilane, and the like. In some embodiments, the silane can be a silane-containing resin.

The silyl compound will be the reaction product of the silane compound and the acid site ($H^+$) on the conjunct polymer. When the silane has one the formulas above, the silyl compound will have the formula: $R_3SiX$, $R_2SiX_2$, $RSiX_3$, or $SiX_4$, where each R is independently selected from hydrocarbons, and each X is independently selected from halides.

The borane compound can be any borane compound having a reactive B—H bond. In some embodiments, the borane compound is an organoborane. There can be one or more boranes. Suitable borane compounds include, but are not limited to, boranes having the formulas: $R_2BH$ or where each R is independently selected from hydrocarbons or halides, or $B_2H_6$, or combinations thereof. Examples of suitable boranes include 9-borabicyclo (3,3,1) nonane, trimesitylborane, trisec-butylborane, diborane, and the like. In some embodiments, the borane can be a borane-containing resin.

The boryl compound will be the reaction product of the borane compound and the acid site ($H^+$) on the conjunct polymer. When the borane has the formula $R_2BH$, the boryl compound will have the formula: $R_2BX$, where each R is independently selected from hydrocarbons or halides. When the borane has the formula $B_2H_6$, the boryl compound is a boron halide compound.

The contacting time for silane compounds is typically in the range of about 5 sec to about 1 hr, or about 1 min to about 45 min, or about 1 min to about 30 min, or about 1 min to about 15 min. For borane compounds at room temperature, the reaction is slower than with the silane, e.g., many hours. The contacting time needed is less at elevated temperatures, e.g., less than 2 hr at 60° C.

The contacting typically takes place at a temperature in the range of from about −20° C. to the decomposition temperature of the ionic liquid. A typical temperature range is about 20° C. to about 80° C. In some embodiments, the contacting takes place at room temperature. In some embodiments with borane compounds, the contacting takes place at temperatures in the range of about 40° C. to about 80° C., or about 70° C.

The pressure is typically ambient pressure, although higher or lower pressures could be used if desired.

In some embodiments, the reaction is conducted under an inert gas so that hydrolysis of ionic liquid and/or the silane or borane compounds does not occur. Suitable inert gases include, but are not limited to, nitrogen, helium, neon, argon, krypton, and xenon.

In some embodiments, the volume ratio of the solvent (when present) to the deactivated acidic ionic liquid is in a range of about 0.25:1 to about 10:1.

In some embodiments, the molar ratio of the silane compound to the conjunct polymer is in a range of about 1:1 to about 5:1, or about 2:1 to about 3:1. In some embodiments, the molar ratio of the borane compound to the conjunct polymer is in a range of about 0.5:1 to about 5:1, or about 2:1 to about 3:1. In some embodiments, the silane or borane compound can be present in excess of the amount needed for reaction with the conjunct polymer, and the excess silane or borane compound can act as a solvent. In these cases, the molar ratio of the silane compound or borane compound to the conjunct polymer is more than 5:1, e.g., in the range of 10:1 to about 1000:1.

The contacting step may be practiced in laboratory scale experiments through full scale commercial operations. The process may be operated in batch, continuous, or semi-continuous mode. The contacting step can take place in various ways, with both countercurrent and co-current flow processes being suitable. The order of addition of the reactants is not critical. For example, the reactants can be added individually, or some reactants may be combined or mixed before being combined or mixed with other reactants. After contacting the ionic liquid catalyst and the silane or borane compound, two phases result, an ionic liquid catalyst phase containing the ionic liquid catalyst and an organic phase containing the conjunct polymer, the silyl or boryl compound, and solvent, if present.

The contacting can take place in any suitable process, such as solvent extraction, or contacting in one or more mixer/settlers. In the solvent extraction process, a solvent and a silane or borane compound are added to the ionic liquid containing conjunct polymer. The solvent and the silane or borane compound can be pre-mixed and added together, or they can be added separately, either at the same time or sequentially. Solvent is not always necessary, but it will maximize recovery, removal, and separation of the conjunct polymer.

The solvent will depend on the ionic liquid catalyst being regenerated. The solvent can be any solvent which is capable of forming a separate phase from the catalyst phase. There can be one or more solvents. Suitable solvents for halometallate ionic liquids include, but are not limited to, n-paraffins, isoparaffins, and cyclic paraffins, such as $C_4$ to $C_{10}$ paraffins, and aromatic solvents. If the ionic liquid is soluble in hydrocarbons, more polar solvents which are not miscible in the ionic liquid would be used. The use of organic solvents may be less desirable with oxidizing acids.

The silane or borane compound reacts with the free acid and acid sites associated with the conjunct polymer. After these acid sites are quenched, the conjunct polymer migrates from the ionic liquid phase to the organic phase and can be extracted.

The reaction will proceed simply by contacting the silane or borane compound with the ionic liquid catalyst. However, the mixture can be subjected to high shear mixing to increase the contact between the silane or borane compound and the ionic liquid catalyst.

In a system without high shear mixing or after high shear mixing is ended, the components can separate into two phases based on the density difference between the ionic liquid phase and the organic phase which contains the conjunct polymer. The ionic liquid will settle to the bottom, and the organic phase containing the unreacted silane or borane compounds, the silyl or boryl compounds, and the conjunct polymer will be on top of the ionic liquid layer. Increasing the top layer with additional solvent will increase conjunct polymer recovery. Separation typically takes on the order of a few minutes to hours; it is generally less than about 1 hr.

The ionic liquid catalyst phase 120 can be recycled to the hydrocarbon process (not shown). The ionic liquid can be reactivated by adding an appropriate acid before being returned to the hydrocarbon process. Suitable acids and acid precursors include, but are not limited to, HCl, tert-butyl chloride, or 2-chlorobutane. The acid precursor can be any molecule that will break down to form the acid. Reactivation of the ionic liquid with acid or acid precursor typically takes about 5 sec to about 30 min. It can be done at a range of temperatures. For convenience, it is typically done at the same conditions as the hydrocarbon conversion process which generates the conjunct polymer.

The organic phase 125 containing the conjunct polymer and the silyl or boryl compound can be sent to a coalescer 130 for further separation.

Typical operating conditions for the coalescer 130 include an operating pressure of about 483 kPa (g) (70 psig) to about 1034 kPa (g) (150 psig), or about 552 kPa (g) (80 psig) to about 931 kPa (g) (135 psig), and a temperature in the range of about 32° C. (90° F.) to about 149° C. (300° F.), or about 38° C. (100° F.) to about 104° C. (220° F.).

A stream of ionic liquid 135 can be removed from the coalescer 130, optionally combined with ionic liquid catalyst phase 120 from the regeneration zone 115, and recycled as discussed above.

The organic phase 140 from the coalescer 130 is sent to a fractionation column 145 for separation. An overhead stream 150 of unreacted silane or borane compound and solvent (if present) is recycled to the ionic liquid regeneration zone 115. The bottoms stream 155 contains the conjunct polymer and the silyl or boryl compounds.

Typical operating conditions for the fractionation column 145 include an operating pressure of about 0 kPa (g) (0 psig) to about 552 kPa (g) (80 psig), or about 69 kPa (g) (10 psig) to about 276 kPa (g) (40 psig), and a temperature in the range of about 27° C. (80° F.) to about 282° C. (540° F.), or about 38° C. (100° F.) to about 232° C. (450° F.).

There can optionally be a side-draw stream 160 containing a portion of the silyl or boryl compounds.

The composition of the bottoms stream 155 can be controlled by controlling the flow rate of the side-draw stream 160 using one or more valves and controllers as is known to those skilled in the art. For example, flow rate of stream 160 can be adjusted based on a tray temperature below the side-draw tray. If the tray temperature is too high, the flow of stream 160 is decreased and the flow of bottoms stream 155 is increased. In this way, more of the intermediate boiling silyl or boryl material is removed with the bottoms stream 155. Alternatively, the flow rate of the bottoms stream 155 can be controlled using one or more valves and controllers as is known to those skilled in the art, and the reboiler temperature or temperature of a tray above the reboiler can be monitored. If the monitored temperature is too high, the flow of the bottoms stream 155 is increased, and the flow of stream 160 is decreased. In the same way as controlling the flow of stream 160, more of the intermediate boiling silyl or boryl material is removed with the bottoms stream 155.

The bottoms stream 155 is sent to an adsorption zone 165. The adsorption zone 165 can include one or more adsorption columns 170. The conjunct polymer is retained on the adsorbent, while the silyl or boryl compounds flow through the adsorption zone 165.

Liquid phase operation of the adsorption zone 165 is preferred. Typical operating conditions for the adsorption zone 165 include an operating pressure of about 207 kPa (g) (30 psig) to about 689 kPa (g) (100 psig), or about 414 kPa (g) (60 psig) to about 552 kPa (g) (80 psig), and a temperature in the range of about 27° C. (80° F.) to about 282° C. (540° F.), or about 32° C. (90° F.) to about 177° C. (350° F.).

Suitable adsorbents include, but are not limited to, alumina, silica, aluminosilicate, and activated carbon.

Depending on the amount of conjunct polymer removed, the adsorbent beds may or may not be regenerable. If the adsorbent bed is regenerable, the conjunct polymer can be desorbed from the adsorbent bed using a desorbent. Suitable desorbents include, but are not limited to decalin, tetralin, heavy alkylates, heavy naphtha, methylcyclohexane, alkyl napthenics, and supercritical $CO_2$. Another regeneration process involves calcinating the adsorbent at high temperature (e.g., about 450° C. to about 600° C.) in air or in the presence of oxygen to decompose the conjunct polymer. The conjunct polymer could also be steam stripped at high temperature (e.g., about 450° C. to about 600° C.) to break the conjunct polymer into lighter hydrocarbons. If the adsorbent bed is not regenerable, the bed is flushed, and the adsorbent with the conjunct polymer is discarded as a solid waste material.

The adsorption zone 165 can be operated in a swing mode such that one (or more) adsorption column is being used to remove the conjunct polymer while one (or more) adsorption column is being regenerated or replaced.

The stream 175 of silyl or boryl compounds can be treated to recover the initial silane or borane compound (not shown). One method involves reaction with one or more compounds containing hydrogen, such as one or more metal hydrides. The reaction can take place in a suitable solvent, such as tetrahydrofuran (THF) or toluene. The silyl or boryl compound is converted back to the silane or borane compound and a metal salt byproduct. Suitable metal hydrides include, but are not limited to, LiH, NaH, $CaH_2$, $NaAlH_4$, $LiAlH_4$, KH, $NaBH_4$, diisobutylaluminum hydride, and the like.

Figure 2:
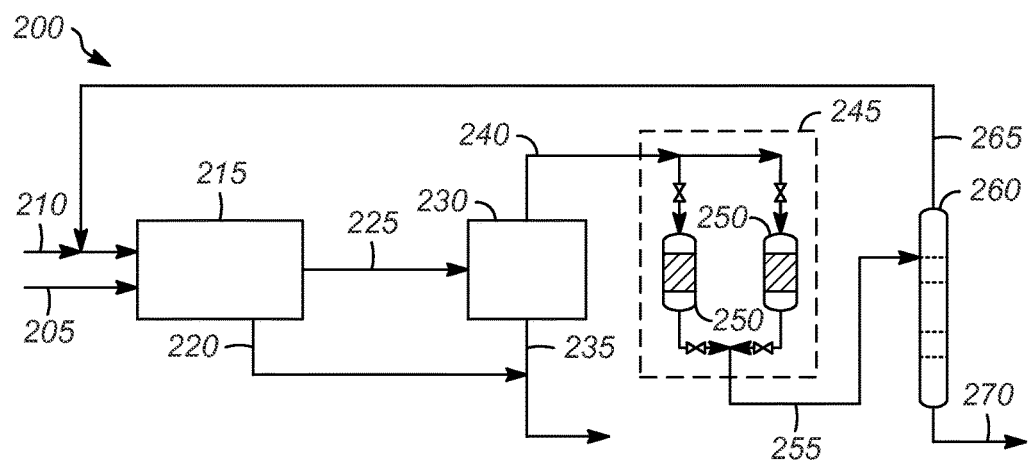
FIG. 2 illustrates another embodiment of a method for separating conjunct polymer from an organic phase according to the present invention.

In the process 200 illustrated in FIG. 2, the stream 205 of deactivated ionic liquid catalyst containing the conjunct polymer and the stream of silane or borane compounds 210 and solvent (if present) are contacted in the ionic liquid regeneration zone 215 so that the conjunct polymer reacts with the silane or borane compound. The mixture is separated into the ionic liquid phase and the organic phase. The ionic liquid phase 220 is removed and recycled.

The organic phase 225 containing the conjunct polymer, unreacted silane or borane compounds, the silyl or boryl compound, and any solvent is sent to a coalescer 230 for further separation. A stream of ionic liquid 235 is removed from the coalescer 230, combined with ionic liquid catalyst phase 220 from the regeneration zone 215, and recycled.

The organic phase 240, containing the conjunct polymer, unreacted silane or borane compounds, the silyl or boryl compound, and any solvent, from the coalescer 230 is sent to an adsorption zone 245. The adsorption zone 245 can include one or more adsorption columns 250. The conjunct polymer is retained on the adsorbent, while the silane or borane compounds, the silyl or boryl compounds, and any solvent flow through the adsorption zone 245.

Liquid phase operation of the adsorption zone 245 is preferred. Typical operating conditions for the adsorption zone 245 include an operating pressure of about 207 kPa (g) (30 psig) to about 689 kPa (g) (100 psig), or about 414 kPa (g) (60 psig) to about 552 kPa (g) (80 psig), and a temperature in the range of about 27° C. (80° F.) to about 149° C. (300° F.), or about 32° C. (90° F.) to about 121° C. (250° F.).

Stream 255 containing the silane or borane compounds, the silyl or boryl compounds, and any solvent is sent to a fractionation column 260 for separation. An overhead stream 265 of unreacted silane or borane compound and solvent (if present) is recycled to the ionic liquid regeneration zone 215. The bottoms stream 270 contains the silyl or boryl compounds.

Typical operating conditions for the fractionation column 260 include an operating pressure of about 0 kPa (g) (0 psig) to about 552 kPa (g) (80 psig), or about 69 kPa (g) (10 psig) to about 276 kPa (g) (40 psig), and a temperature in the range of about 27° C. (80° F.) to about 260° C. (500° F.), or about 38° C. (100° F.) to about 221° C. (430° F.).

Example: Temperatures at 50% Vaporization of a Conjunct Polymer Mixture

Figure 3:
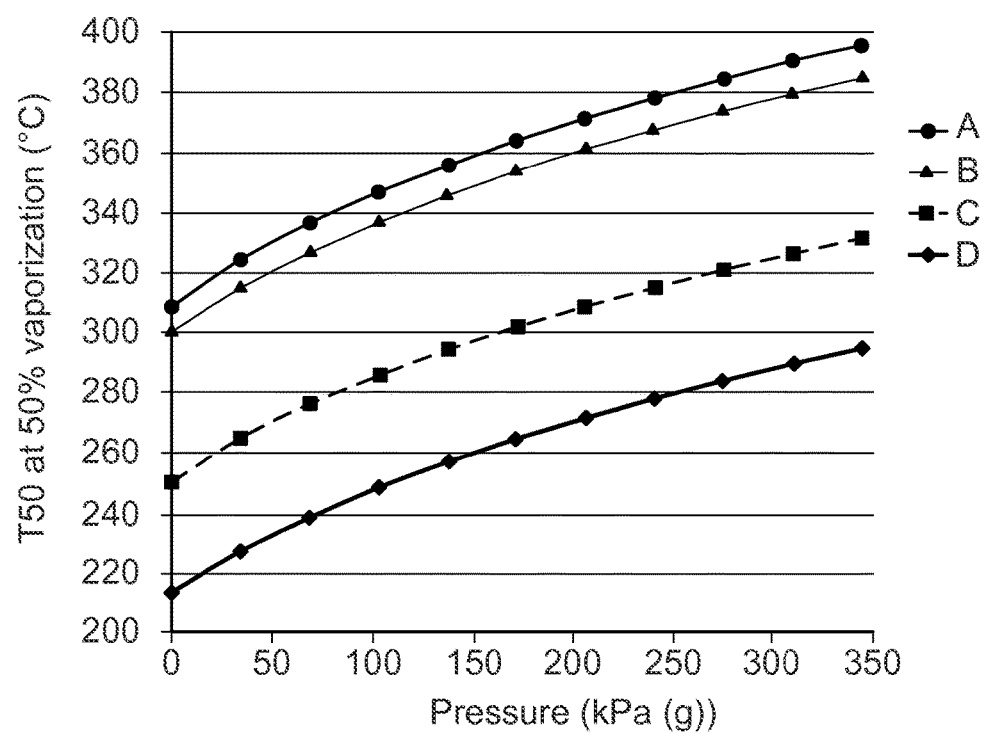
FIG. 3 is a graph showing the temperature at 50% vaporization as a function of pressure for stream containing conjunct polymer and mixtures of conjunct polymer and a silyl compound.

FIG. 3 is a plot showing the temperature at 50% vaporization of a stream containing conjunct polymer (CP) and an amount of Silyl compound as a function of pressure and composition. The data shown in FIG. 3 is from a process simulation. The pressure range is 69 kPa(g) to 276 kPa(g). The CP is characterized by a set of high boiling point/high molecular weight components that represent a typically observed CP boiling range and molecular weight distribution. For a separation by distillation of a mixture of CP, silyl compound and solvent, the CP will be recovered in the bottoms product and the 50% vaporization temperature is indicative of the reboiler temperature. The curves beginning at 300° C. (B is a "lighter" CP) and 310° C. (A is a "heavier" CP) are the 50% vaporization temperature for two silyl and solvent free CP distributions (i.e., pure CPs). The curve beginning at 214° C. is the 50% vaporization temperature for a mixture (D) of the "lighter" CP and an amount of silyl compound equivalent to 100% recovery of the silyl compound in the bottoms stream. The curve beginning at 251° C. is the 50% vaporization temperature for a mixture (C) of the "lighter" CP and an amount of silyl compound equivalent to about 50% recovery of the silyl compound in the bottoms stream. The curves show that increasing the amount of silyl compound recovered with CP lowers the mixture 50% vaporization temperature.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for separating conjunct polymer from an organic phase comprising:
    separating a mixture comprising an ionic liquid phase and the organic phase into the ionic phase comprising ionic liquid and the organic phase comprising the conjunct polymer and at least one silyl or boryl compound having an unreacted silane or borane compound; and
    separating the organic phase in a first fractionation column into at least a first overhead fraction comprising unreacted silane or borane compound and a first bottoms fraction comprising the conjunct polymer and at least a portion of the at least one silyl or boryl compound wherein separating the organic phase in the first fractionation column into at least the first overhead fraction comprising unreacted silane or borane compound and the first bottoms fraction comprising the conjunct polymer and the at least the portion of the at least one silyl or boryl compound comprises separating the organic phase in the fractionation column into at least the first overhead fraction comprising unreacted silane or borane compound, the first bottoms fraction comprising the conjunct polymer and the at least the portion of the at least one silyl or boryl compound, and a fraction comprising at least a second portion of the at least one silyl or boryl compound; and either
    passing the first bottoms fraction through a first adsorption zone;

recovering the at least the portion of the at least one silyl or boryl compound;
or
passing the organic phase through a second adsorption zone;
recovering a stream comprising unreacted silane or borane compound and the at least one silyl or boryl compound;
separating the stream comprising the unreacted silane or borane compound and the at least one silyl or boryl compound in a second fractionation column into at least a second overhead fraction comprising the unreacted silane or borane compound and a second bottoms fraction comprising the at least a portion of the at least one silyl or boryl compound.

2. The process of claim 1 wherein at least one of the first and second adsorption zones contains an adsorbent comprising alumina, silica, aluminosilicate, activated carbon, and combinations thereof.

3. The process of claim 1 wherein separating the mixture comprises:
separating the ionic liquid phase from the organic phase in a gravity separation zone into a first ionic liquid stream and a stream comprising the organic phase containing ionic liquid; and
separating the stream comprising the organic phase containing ionic liquid in a coalescer into a second ionic liquid stream and an organic stream; and
wherein separating the organic phase in the first fractionation column comprises separating the organic stream in the first fractionation column;
or
wherein passing the organic phase through the second adsorption zone comprises passing the organic stream through the second adsorption zone.

4. The process of claim 1 further comprising at least one of:
recycling the ionic liquid phase to a reaction zone; and
recycling the first or second overhead fraction to a regeneration zone.

5. The process of claim 1 further comprising:
controlling a composition of the first bottoms fraction by controlling a flow rate of the fraction comprising at least the second portion of the at least one silyl or boryl compound or a flow rate of the first bottoms fraction.

6. The process of claim 1 wherein the organic phase further comprises a solvent; and
either
wherein the first overhead fraction comprises the solvent;
or
wherein the stream comprising unreacted silane or borane compound and the at least one silyl or boryl compound further comprises the solvent, and wherein the second overhead fraction comprises the solvent.

7. The process of claim 6 wherein the solvent comprises a normal paraffin, an isoparaffin, or a cyclic paraffin having up to 10 carbon atoms, an aromatic, or the at least one silane or borane compound.

8. The process of claim 1 further comprising:
desorbing the conjunct polymer from the first or second adsorption zone; and
recovering the conjunct polymer.

9. The process of claim 8 wherein desorbing the conjunct polymer from the first or second adsorption zone comprises at least one of:
introducing a desorbent into the first or second adsorption zone;

calcinating the adsorbent in air or presence of oxygen; and
steam stripping the adsorbent.

10. The process of claim 1 further comprising:
replacing an adsorbent in the adsorption zone.

11. A process for separating conjunct polymer from an organic phase comprising:
separating a mixture comprising an ionic liquid phase comprising ionic liquid and the organic phase comprising the conjunct polymer and at least one silyl or boryl compound in a gravity separator into a first ionic liquid stream and a stream comprising the organic phase containing ionic liquid;
separating the stream comprising the organic phase containing ionic liquid in a coalescer into a second ionic liquid stream and an organic stream having an unreacted silane or borane compound; and
separating the organic stream in a fractionation column into at least a first overhead fraction comprising unreacted silane or borane compound and a bottoms fraction comprising the conjunct polymer and at least a portion of the at least one silyl or boryl compound
wherein separating the organic stream in the fractionation column into at least the first overhead fraction comprising unreacted silane or borane compound and the bottoms fraction comprising the conjunct polymer and the at least the portion of the at least one silyl or boryl compound comprises separating the organic stream in the fractionation column into at least the first overhead fraction comprising unreacted silane or borane compound, the bottoms fraction comprising the conjunct polymer and the at least the portion of the at least one silyl or boryl compound, and a fraction comprising at least a second portion of the at least one silyl or boryl compound; and either
passing the bottoms fraction through a first adsorption zone containing an adsorbent comprising alumina, silica, aluminosilicate, activated carbon, and combinations thereof;
recovering the at least the portion of the at least one silyl or boryl compound;
or
passing the organic stream through a second adsorption zone containing an adsorbent comprising alumina, silica, aluminosilicate, activated carbon, and combinations thereof;
recovering a stream comprising unreacted silane or borane compound and the at least one silyl or boryl compound;
separating the stream comprising unreacted silane or borane compound and the at least one silyl or boryl compound in a fractionation column into at least a second overhead fraction comprising the unreacted silane or borane compound and a second bottoms fraction comprising the at least a portion of the at least one silyl or boryl compound.

12. The process of claim 11 further comprising at least one of:
recycling at least one of the first and second ionic liquid streams to a reaction zone; and
recycling the first or second overhead fraction to a regeneration zone.

13. The process of claim 11 further comprising:
controlling a composition of the first bottoms fraction by controlling a flow rate of the fraction comprising at least the second portion of the at least one silyl or boryl compound or a flow rate of the first bottoms fraction.

14. The process of claim 11 wherein the organic phase further comprises a solvent; and
either
wherein the first overhead fraction comprises the solvent; or
wherein the stream comprising unreacted silane or borane compound and the at least one silyl or boryl compound further comprises the solvent, and wherein the second overhead fraction comprises the solvent.

15. The process of claim 11 further comprising:
converting the at least one silyl or boryl compound into the at least one silane or borane compound.

16. The process of claim 11 further comprising:
desorbing the conjunct polymer from the first or second adsorption zone; and
recovering the conjunct polymer.

17. The process of claim 16 wherein desorbing the conjunct polymer from the adsorption zone comprises at least one of:
introducing a desorbent into the adsorption zone;
calcinating the adsorbent in air or presence of oxygen; and
steam stripping the adsorbent.

18. The process of claim 11 further comprising:
replacing an adsorbent in the adsorption zone.

* * * * *